Patented Dec. 11, 1945

2,390,848

UNITED STATES PATENT OFFICE 2,390,848

RODENTICIDE

Curt P. Richter, Baltimore, Md., assignor to the United States of America, as represented by the Secretary of War No Drawing. Application December 31, 1943, Serial No. 516,565

9 Claims. (Cl. 167—46)

This invention generically relates to pest combating substituted thioureas; more specifically, it is directed to a rodenticide containing as its active ingredient an N-monoaryl thiourea characterized by its molecular weight and high degree of insolubility in water.

One object of this invention is to provide a rodenticide containing as its basic substance N-aryl thioureas of the general formula:

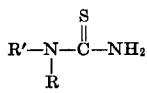

in which R represents hydrogen or a lower aliphatic group of not more than six carbon atoms, and R' an aromatic group having a molecular weight of at least 100 so that the molecular weight of the compound as a whole is at least 175.

Another object of this invention is to provide a rodenticide containing as its effective ingredient an N-aryl thiourea of the general formula hereinabove stated wherein R is hydrogen and R' an aromatic substituent of more than six carbon atoms, one of the carbon atoms being linked directly to the nitrogen of the thiourea such as N-(1-naphthyl)thiourea represented by the formula:

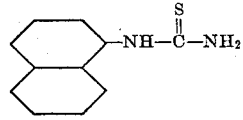

Another object of this invention is to provide a rodenticide of the character specified having a solubility in water of less than 150 mg. per 100 cc. of water at 25° C.

Another object of this invention is to provide a rodenticide containing the new compound, N-(2-biphenyl)thiourea.

Another object of the invention is to provide rodenticide compositions which are safe in handling, efficient in use, economical to manufacture and highly lethal to wild rodents but not lethal (except in large amounts) to domestic animals.

Other objects and advantages of the improved rodenticide will readily appear from the following description thereof.

It has long been recognized by those concerned with the problem of eradicating rodentia particularly rats (which important problem has not heretofore been satisfactorily solved) that the use of poisonous baits is the only economically feasible method of exterminating large, unconfined rat populations such as exist in large cities. Although many compounds have been suggested and used as the poisonous constituents of baits, all have had serious disadvantages that have precluded widespread success in application. Strychnine, phosphorus and compounds of barium, arsenic, and thallium, while effective, are extremely hazardous to humans and domesticated animals. Red squill does not have the above-mentioned disadvantage, since it is not lethal to animals capable of regurgitation. On the other hand, its potency is relatively low, and, moreover, it varies with the source and conditions of handling and storage of the bulbs. Furthermore, red squill is expensive and the supply is always uncertain since it depends upon imports from the Mediterranean regions.

A preliminary, though still unsatisfactory, approach to a practical rat poison was made by Richter and Clisby in their report on phenylthiocarbamide taste thresholds of rats (American Journal of Physiology 134, 157–164 (1941)). The laboratory experiments of Richter and Clisby showed that phenylthiocarbamide has a highly toxic effect on rats, 1 to 2 mg. being sufficient to kill them in only a few hours. However, the taste of the compound was so repellent to rats that the animals would not take it unless it was thoroughly disguised by admixture with their favorite foods. In fact, the authors state (ibid. p. 161) that "The results of these experiments have demonstrated that most of the rats avoided highly toxic phenylthiocarbamide even in very low concentration." It will thus be seen that phenylthiocarbamide when thoroughly disguised in baits killed about fifty per cent of the rats, but under natural conditions it killed very few wild rats on account of the uncanny ability of the animals to detect this highly bitter compound even in extremely low concentration. Wild rats avoid the bait, with the result that phenylthiocarbamide is unsuccessful as a practical rat poison.

I have now found that compositions containing certain selected aryl thioureas, defined more precisely hereinafter, are highly lethal to wild rats and at the same time are so insoluble in the oral secretions that the animals cannot detect the poison until many times the minimum lethal dose has been ingested. Since these new compositions are cheap and easily manufactured, do not give off odors or fumes, can be handled safely, and are not lethal (except in large amounts) to domesticated animals, the long sought goal of a safe, efficient, and economical rat poison appears to have been achieved.

The compositions of this invention are rodenticides containing, as their essential active ingredient, an N-monoaryl thiourea having a molecular weight greater than 175 and a solubility in water at 25° C. less than about 150 mg. per 100 cc.

Phenylthiocarbamide, previously found to be lethal to rats in the laboratory, but substantially useless as a practical rat poison for use in the field, is characterized by a solubility in water of about 0.25% at 25° C. I have found that it is this relatively high solubility which negatives the value of the compound as a practical rat poison by allowing the rats to taste and reject it in baits such as would normally be used under actual field conditions. The N-aryl thioureas useful for the purpose of this invention, on the other hand, are characterized by having such a low solubility that rats are unable to taste them, yet they are so toxic to rats that their lethal action is swift and certain when as little as 2 mg. is ingested.

The compounds contemplated for use in this invention are defined as N-monoaryl thiourea having a solubility in water at 25° C. of less than about 150 mg. per 100 cc. Preferably, these N-aryl thioureas have a solubility in the range of 2 mg. to 30 mg. in 100 cc. of water at 25° C.

More particularly, the thioureas contemplated by this invention may be defined as those represented by the general formula:

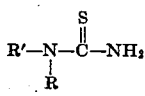

in which R is hydrogen or a lower aliphatic hydrocarbon radical of not more than six carbon atoms and R' is an aromatic radical of molecular weight at least 100, so that the molecular weight of the compound as a whole is at least 175. Those N-aryl thioureas in which R is hydrogen are preferred, and, of these, the most useful one from the standpoint of effectiveness, availability, and convenience is N-(1-naphthyl)thiourea henceforth to be referred to as "Antu":

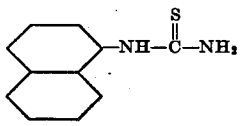

The thioureas of this invention may be prepared by well known methods. For example, aromatic amines may be reacted with ammonium, sodium or potassium thiocyanate in the presence of mineral acids. As alternative methods, the appropriate aryl isothiocyanate may be reacted with ammonia, or an N-aryl dithiocarbamic acid or ester may be converted to the thiourea by reaction with ammonia. Various methods of preparing N-(1-naphthyl)thiourea are given in Beilstein, 4th ed., vol. 12, p. 1241 (1929). A preparation of N-phenylthiourea that may be generally applicable to other N-aryl thioureas is described by Meyer and Jacobseon, "Lehrbuch der Organischen Chemie," vol. 2, part 1, p. 200.

The following examples of extended laboratory and field experiments demonstrate the high utility of the new N-aryl thiourea rodenticides in eradicating large populations of rats:

In the laboratory, tests have been made on domestic and wild rats under a great variety of conditions. A few examples will be given:

1. 10 domestic rats were given "Antu" 1% mixed with ground corn } Mortality: 100% in 36 hours.
2. 20 wild rats were given "Antu" 1% mixed with ground corn } Mortality: 100% in 47 hours.
3. 20 wild rats were given corn dusted with "Antu" } Mortality: 100% in 40 hours.
4. 10 wild rats were given pellets rolled in a mixture of 15% "Antu" and starch } Mortality: 100% in 22 hours.
5. 20 wild rats were given a choice of raw corn or garbage lightly dusted with "Antu" } Mortality: 100% in 42 hours.
6. 15 domestic rats were offered a choice of 6% dispersion of micronized "Antu" and tap water } Mortality: 100% in less than 24 hours.

In the field the poison has been used on dumps, markets, city dwellings, yards, terminals, etc., as is shown by the following examples:

1. Dusted ("Antu") raw corn was distributed in yards and alleys of small city block } 40 dead rats recovered within 48 hours.
2. Poisoned (Antu 1%) ground corn placed in small paper cups and distributed in yards, alleys of small city block } 78 dead rats recovered within 60 hours.
3. A large produce terminal in which rats had daily destroyed large quantities of fruit and vegetables for years was prebaited with corn, then baited with poisoned (Antu 1%) corn } All rats disappeared and no more produce destroyed (last check made about 3 months).
4. A large city market, covering two long city blocks, in which rats have been seen day and night for many years and where they have destroyed large quantities of produce, was baited with poisoned (Antu 1%) finely ground corn, sprayed sweet potatoes, turnips, etc. } Over 150 dead rats recovered within 60 hours. No rats seen day or night for next 6 weeks, although market located in heavily infested part of town.
5. A chicken coop was baited with poisoned (Antu 1%) chicken meal } 78 dead rats recovered within 48 hours.

The following table shows the solubility of some of the thioureas at 25° C. It will be noted that phenylthiocarbamide is over 20 times as soluble as N(1-naphthyl)thiourea:

| Thiourea | Mol. wt. | Solubility |
|---|---|---|
| N-phenyl- | 152 | 250 mg./100 cc. at 25° C. |
| N-o-tolyl- | 166 | 236 mg./100 cc. at 25° C. |
| N(2, 5-dichlorophenyl)- | 221 | 25 mg./100 cc. at 25° C. |
| N(1-naphthyl)- | 202 | 12 mg./100 cc. at 32° C. |
| N(2-naphthyl)- | 202 | 28 mg./100 cc. at 25° C. |
| N(2-biphenyl)- | 228 | 2.8 mg./100 cc. at 32° C. |
| N(4-biphenyl)- | 228 | 10 mg./100 cc. at 25° C. |

The highly insoluble thioureas have proved much more effective than the more soluble phenylthiocarbamide. When given in a 1 percent bait to domestic and wild rats this latter compound rarely killed more than 60 percent of the rats. When used in the field, especially on city dumps, in stores and in factories, it killed only a small percentage of the rats so that with its use such locations could not be freed of all rats.

By means of a simple test, the degree to which rats are able to taste the thioureas and other substances that have been used as rat poisons has been determined. In these tests, rats are given only one bottle of water. The amount taken is recorded daily. Then the water is replaced with a saturated solution (at room temperature) of the test substance filtered cold. The per cent decrease in intake (average for the next 10 days) measures the degree to which the rats are able to taste the compound:

| | Approx. solubility at 25° C. in 100 cc. water | Decrease in water intake | Approx. lethal dose for rats |
|---|---|---|---|
| | Mg. | Percent | Mg. |
| Barium carbonate | | 1.1 | |
| N-(2-biphenyl) thiourea, crude | 2.8 | 1.5 | 1-2 |
| N-(4-biphenyl) thiourea | 2.8 | 6.4 | 1-3 |
| N-(2-biphenyl) thiourea, pure | 2.8 | 14.0 | 1-2 |
| N-(1-naphthyl) thiourea | 12 | 27.9 | 2-4 |
| Thallium | | 59.2 | |
| Squill | | 72.0 | 300-2,000 |
| Morphine sulphate | | 83.4 | |
| Phenylthiocarbamide | 250 | 88.2 | 1-2 |
| Sodium fluoride | | 88.8 | |
| Arsenic trioxide | | 89.2 | |

Barium carbonate has less taste than any of the thioureas, but it is much less toxic. Some of the other compounds are almost as toxic, but are tasted too readily.

These compounds can be mixed with a variety of baits, such, for instance, as ground corn, rye, wheat, ground meat, chicken and turkey heads. They can also be used when mixed into pellets with the following ingredients: graham flour—90 percent, molasses 9 percent, Antu—1 percent.

The compounds may be dusted in a fine powder with or without diluents such as talc, pyrophyllite, etc. They may be mixed with flour and used to cover pellets, meat, etc. When finely micronized, the powder is held in suspension in water for several days and may then be used to poison rats in dry areas with no access to water.

N-(1-naphthyl)thiourea has been used effectively on mice. In one building 60 dead mice were recovered in 24 hours after poisoning.

It will thus be seen that a novel and efficient rodenticide has been discovered, which is highly efficient for the purpose intended. Even though there has herein been disclosed specific rodenticide compositions as comprising the invention, it is nevertheless to be understood that various changes may be made therein, if the changes do not depart from the spirit or scope of the claims.

Having thus described my invention, what I claim as new and wish to secure by Letters Patent is:

1. A rodenticide containing as its effective ingredient an organic thiourea of the general formula:

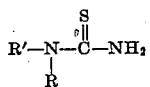

wherein R represents a member of the group consisting of hydrogen and lower aliphatic radicals containing not more than six carbon atoms and R' represents a radical having a molecular weight of at least 100 and selected from the group consisting of radicals of the benzene and naphthalene series, and a dispersion medium for said organic thiourea.

2. A rodenticide containing as its effective ingredient an organic thiourea of the general formula:

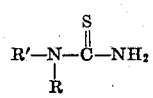

wherein R represents a member of the group consisting of hydrogen and lower aliphatic radicals containing not more than six carbon atoms and R' represents a radical selected from the group consisting of radicals of the benzene and naphthalene series, the molecular weight of the derivatives as a whole being at least 175, and a dispersion medium for said organic thiourea.

3. A rodenticide containing as its effective ingredient an organic thiourea of the general formula:

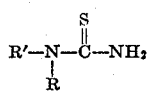

wherein R represents a member of the group consisting of hydrogen and lower aliphatic radicals containing not more than six carbon atoms and R' represents a radical having a molecular weight of at least 100 and selected from the group consisting of radicals of the benzene and naphthalene series whereby the derivative as a whole will have a molecular weight of at least 175, and a dispersion medium for said organic thiourea.

4. A rodenticide containing as its effective ingredient an organic thiourea of the general formula:

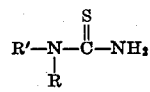

wherein R represents a member of the group consisting of hydrogen and lower aliphatic radicals containing not more than six carbon atoms and R' represents a radical selected from the group of radicals of the naphthalene series, and a dispersion medium for said organic thiourea.

5. A rodenticide including as its active ingredient N-(1-naphthyl)thiourea, and a dispersion medium therefore.

6. A rodenticide including as its active ingredient N-(2-biphenyl) thiourea, and a dispersion medium therefor.

7. A rodenticide including as its active ingredient N-(4-biphenyl) thiourea, and a dispersion medium therefor.

8. A rodenticide composition consisting of flour, molasses and an N(1-naphthyl) thiourea.

9. A rodenticide composition of 90% flour, 9% molasses and 1% N-(1-naphthyl) thiourea.

CURT P. RICHTER.